US005603306A

United States Patent [19]

Tai

[11] Patent Number: 5,603,306

[45] Date of Patent: Feb. 18, 1997

[54] IGNITION CABLE MEANS FOR ELIMINATING INERFERENCE

[76] Inventor: Tsai-Ting Tai, C/O Hung Hsing Patent Service Center P.O. Box 55-1670, Taipei, Taiwan

[21] Appl. No.: 382,857

[22] Filed: Feb. 3, 1995

[51] Int. Cl.[6] .......................... H04B 15/02; H01R 13/46

[52] U.S. Cl. .......................... 123/633; 123/169 PH; 333/172; 439/126

[58] Field of Search .......................... 123/169 PA, 169 PH, 123/633; 174/355 M; 313/134; 315/58; 333/172, 181; 439/126

[56] References Cited

U.S. PATENT DOCUMENTS

| | | | |
|---|---|---|---|
| 1,230,615 | 6/1917 | Steinmetz | 123/633 X |
| 2,134,946 | 11/1938 | Hurley | 123/169 PH |
| 3,191,133 | 6/1965 | Texsier | 123/633 X |
| 3,965,879 | 6/1976 | Fitzner | 123/169 PH X |
| 4,078,534 | 3/1978 | Mayer | 123/169 PH X |
| 4,590,536 | 5/1986 | Gerry | 123/633 X |
| 4,774,914 | 10/1988 | Ward | 123/633 X |

*Primary Examiner*—Tony M. Argenbright
*Attorney, Agent, or Firm*—Pro-Techtor International

[57] ABSTRACT

An ignition coaxial cable includes at least a braided layer of copper wires surrounding a central or inner conductor existing at a longitudinal center of the coaxial cable for shielding and grounding the interference caused by the high voltage carried by the cable, and an interference eliminating circuit having an inductor parallelly connected with a high-impedance resistor and connected in series with a low-impedance resistor to prevent the acute wave forms and to inhibit the surge waves caused by the high-tension voltage pulses delivered from the distributor to the plug, thereby eliminating the interference or electromagnetic interference caused by the high-tension cable and the plug of the car.

9 Claims, 5 Drawing Sheets

IGNITION CABLE MEANS FOR ELIMINATING INERFERENCE

BACKGROUND OF THE INVENTION

A conventional high-tension cable connected between a distributor and a plug of a car engine may induce interference or electromagnetic interference during the connection passage of the cable. Meanwhile, the sparking of the plug by the high voltage about 20 kilo-volts as carried on the cable may produce discharging arc, thereby causing interference to the surroundings to influence the radio-wave transmission or communication or to interfere the nearby electronic devices.

The present inventor has invented an ignition coaxial cable between a car distributor and an engine plug having at least a braided layer shielding the cable and an interference eliminating device for eliminating the interference caused by the high voltage carried by the cable.

SUMMARY OF THE INVENTION

The object of the present invention is to provide an ignition coaxial cable including at least a braided layer of copper wires surrounding a central or inner conductor existing at a longitudinal center of the coaxial cable for shielding and grounding the interferences caused by the high voltage carried by the cable, and an interference eliminating circuit having an inductor parallelly connected with a high-impedance resistor and connected in series with a low-impedance resistor to prevent the acute wave forms and to inhibit the surge waves caused by the high-tension voltage pulses delivered from the distributor to the plug, thereby eliminating the interference or electromagnetic interference caused by the high-tension cable and the plug of the car.

DETAILED DESCRIPTION

Figure 1:
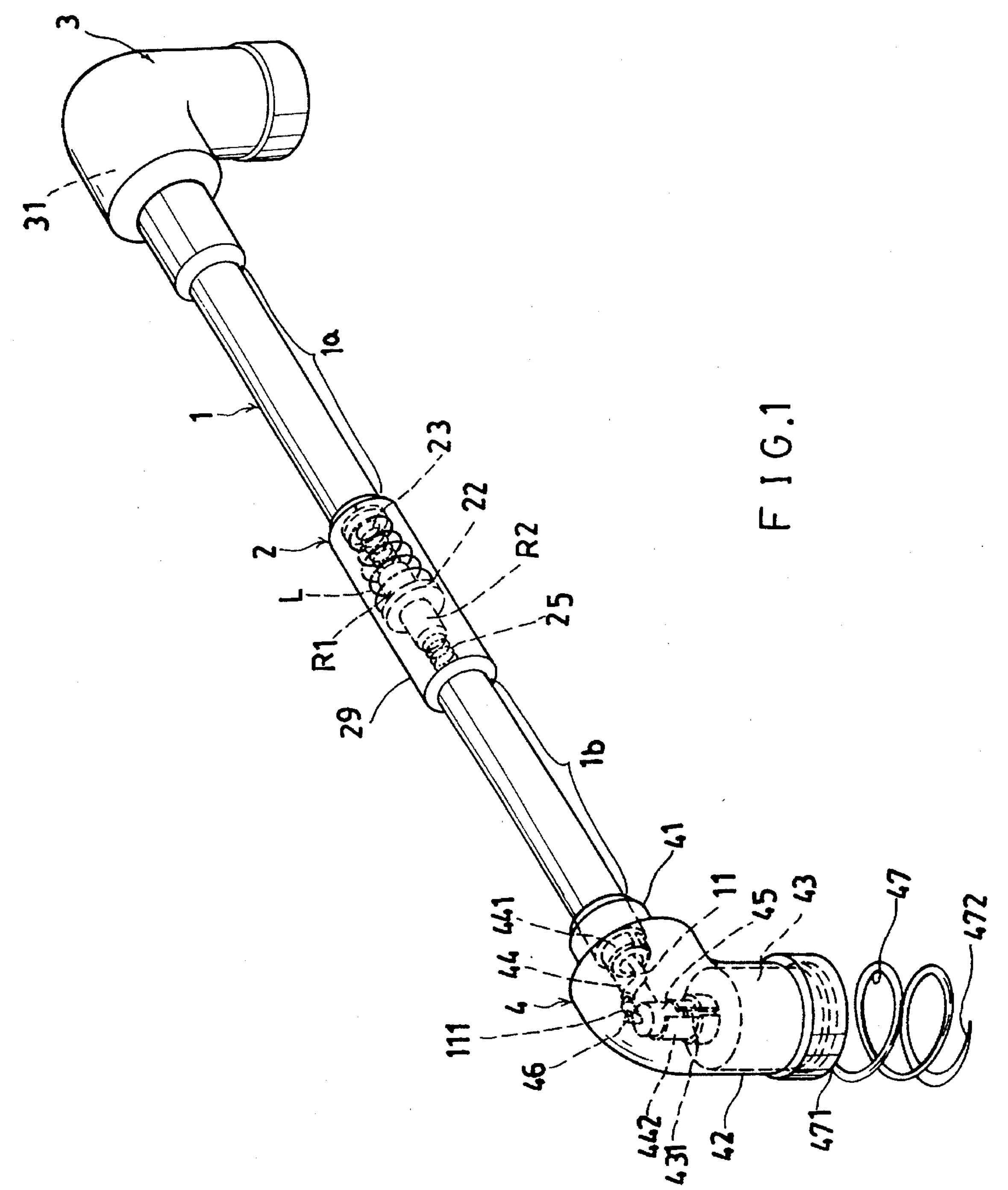
FIG. 1 is a perspective view of the present invention.
Figures 2, 3:
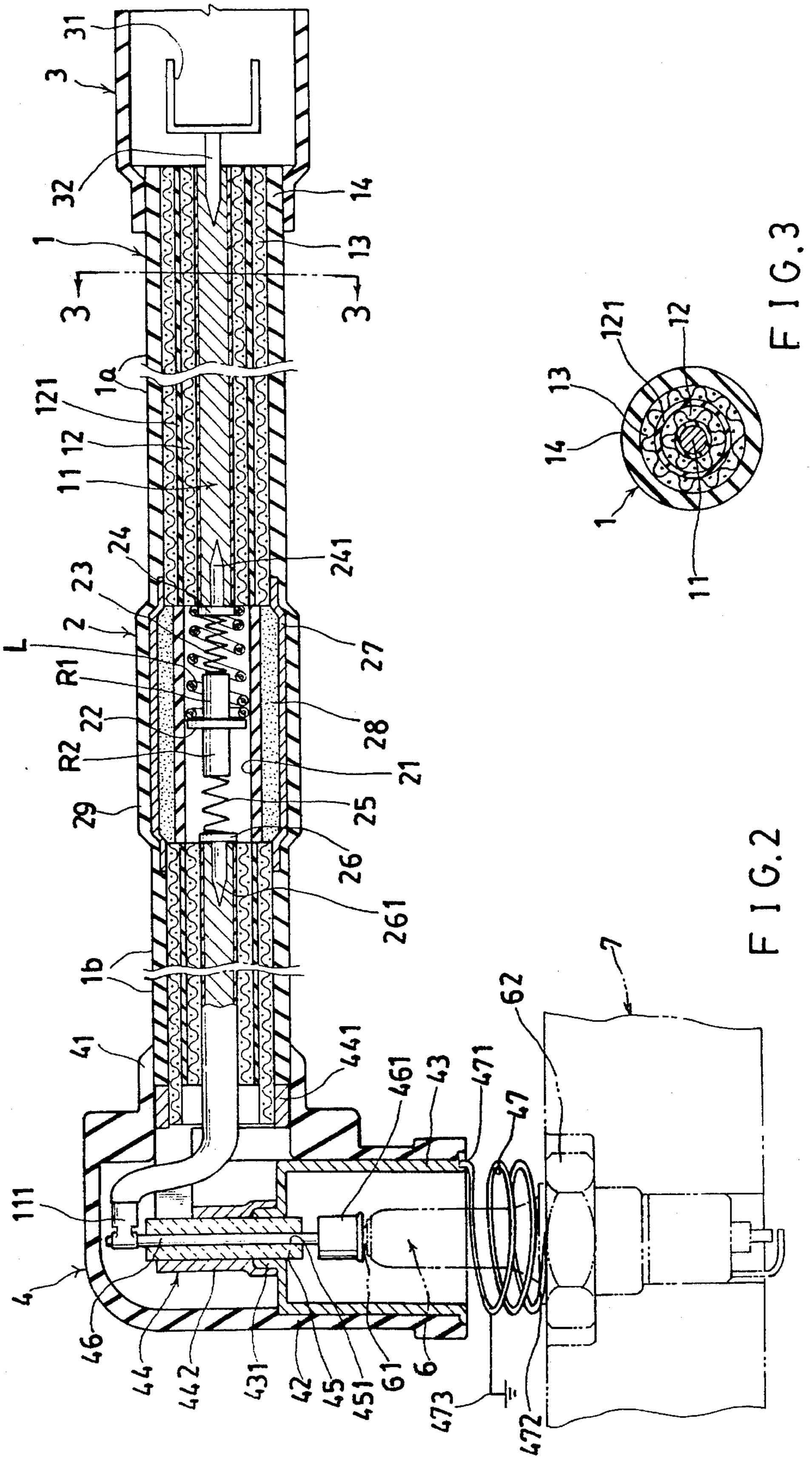
FIG. 2 is a longitudinal sectional drawing of the present invention.
FIG. 3 is a cross sectional drawing of the present invention when viewed from 3—3 direction of FIG. 2.
Figure 4:
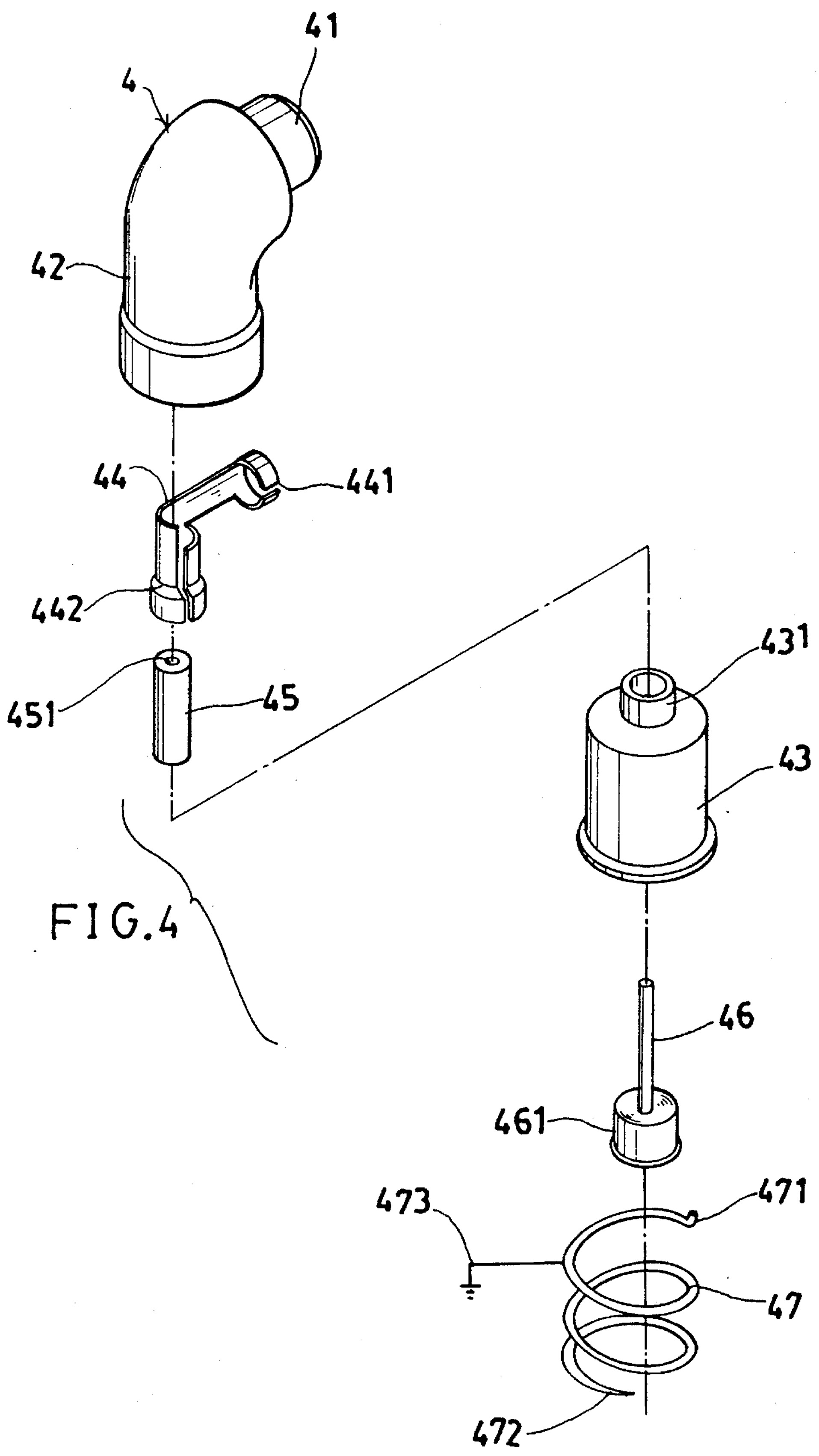
FIG. 4 is an exploded view of an adapter for connecting a plug in accordance with the present invention.

As shown in FIGS. 1–5, the present invention comprises: a coaxial cable 1, an interference eliminating means 2, a first adapter 3 secured on a first end portion of the coaxial cable 1 for connecting a car distributor 5, and a second adapter 4 secured on a second end portion of the cable 1 for connecting an engine plug 6 fixed in an engine cover 7 as shown in dotted line of FIG. 2.

The coaxial cable 1 includes: a first cable section **1*a* connected between the first adapter 3 and the interference eliminating means 2, and a second cable section 1*b* connected between the interference eliminating means 2 and the second adapter 4, each cable section 1*a* or 1*b* having a central conductor 11 which may be made of copper, carbon or graphite durable for high voltage, a first braided layer 12 surrounding the central conductor 11 for shielding any interference emitted from the central conductor 11, and a second braided layer 13 circumferentially disposed around the first braided layer 12 with an electrically insulative layer 121 intermediate between the first and the second braided layers 12, 13 with the second braided layer 13 grounded for grounding and eliminating any interference as induced in the second braided layer 13, and an outer insulative cover 14 clad on the outer circumference of the second braided layer 13**.

Either the first braided layer 12 or the second braided layer 13 may be made of braided copper wires but not limited in this invention.

Figure 5:
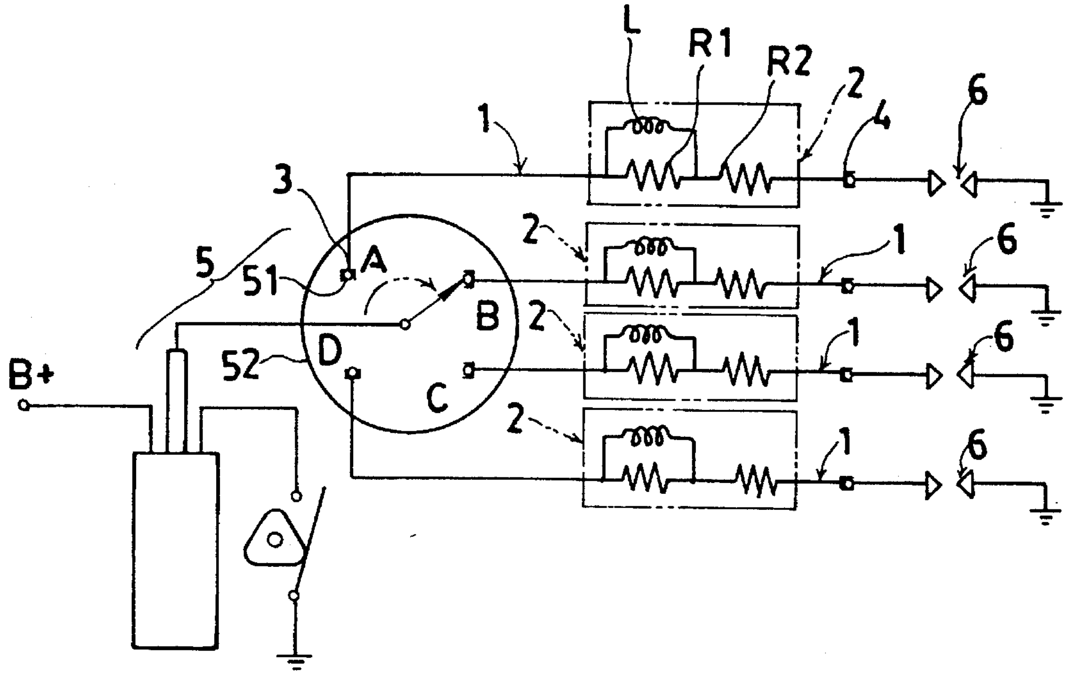
FIG. 5 is a circuit diagram of the present invention showing a plurality of coaxial cables respectively connected between the distributor contactors and the plugs.

The first adapter 3 includes: an adapter contactor 31 connectable to a distributor contactor 51 or electrode formed on a distributor cap 52 as shown in FIG. 5, and a connecting pin 32 secured with the adapter contactor 31 and inserted or connected with an input end of the first cable section **1*a* of the coaxial cable 1**.

The interference eliminating means 2 includes: an electrically insulative sleeve 21 generally cylindrical shaped and connected in between the first and the second cable sections **1*a*, 1*b* and preferably intermediate between two electrically insulative layers 121 each insulative layer 121 partitioned in between the first and the second braided layers 12, 13 in each cable section 1*a* or 1*b*; a high-impedance resistor R1 having a resistance such as of 50 kilo-ohms connected in series with a low-impedance resistor R2 having resistance lower than that of the high-impedance resistor R1 and having a resistance of the low-impedance resistor R2 such as of 1 kilo-ohms, in between two central conductors 11 respectively formed in the first and the second cable sections 1*a*, 1*b*; an inductor L parallelly connected with the high-impedance resistor R1 and connected in series with the low-impedance resistor R2; and a grounding coupler 27 made of electrically conductive cylinder and connecting two second braided layers 13 of the first and the second cable sections 1*a*, 1*b* of the coaxial cable 1 to be grounded for grounding and eliminating any interferences existing in the cable 1**.

The sleeve 21 is made as electrically insulative for preventing a sparking or discharging of a very high voltage between a positive pole and a negative pole as existing in the interference eliminating means 2.

The high-impedance resistor R1 is connected to the low-impedance resistor R2 by a central connecting plate 22 formed in a central portion of the insulative sleeve 21; the inductor L lade of paint-clad coil windings retained between the central connecting plate 22 and a first connector 24 having a connecting pin 241 inserted into the central conductor 11 of the first cable section **1*a* of the coaxial cable 1; the high-impedance resistor R1 having a first electrically conductive spring 23 retained between the high-impedance resistor R1 and the first connector 24 to be connected to the first cable section 1*a* of the coaxial cable 1; and the low-impedance resistor R2 having a second electrically conductive spring 25 retained between the low-impedance resistor R2 and a second connector 26 having a second connecting pin 261 inserted into the central conductor 11 of the second cable section 1b of the coaxial cable 1**.

The electrically insulative sleeve 21 of the interference eliminating means 2 may be made of silicon rubber and is coated with an electrically insulative medium 28 such as made of liquid or gel silicon rubber and the insulative medium 28 is shielded by the grounding coupler 27 which is further covered by an outer insulative sheath 29 intermediate between two outer insulative covers 14 of the first and the second cable sections 1a, 1b.

The second adapter 4 includes: a cable connector 41 for fastening the outer insulative cover 14 of the second cable section 1b, a plug connector 42 secured with the cable connector 41 for coupling an engine plug 6 respectively for connecting the central conductor 11 of the coaxial cable 1 to a central electrode 61 of the plug 6 for igniting the plug 6, and for connecting the second braided layer 13 of the coaxial cable 1 to a grounding wall 62 of the plug 6 for grounding any interference emitted from the braided layer of the coaxial cable 1.

Naturally, the two braided layers 12, 13 can be simplified to be a single braided layer, or even modified to be multiple braided layers, not limited in this invention.

The second adapter 4 further includes: the plug connector 42 made of electrically insulative material, a cylindrical socket 43 made of electrically conductive and secured in the plug connector 42, an elbow member 44 made of electrically conductive and having a first clip 441 for fastening the second braided layer 13 of the coaxial cable 1 and a second clip 442 connected to the first clip 441 for fastening a neck portion 431 formed on one end portion of the cylindrical socket 43, a grounding spring 47 retained between the cylindrical socket 43 and the grounding wall 62 of the plug 6 for grounding any interference caused from the cable 1 and the plug 6, a central conducting stem 46 secured in a central portion in the plug connector 42 and connected with a terminal end portion 111 of the central conductor 11 of the coaxial cable 1 and having an electrode cap 461 secured to the conducting stem 46 for connecting the central electrode 61 of the plug 6 for delivering a high voltage current in the central conductor 11 of the coaxial cable 1 to spark the plug 6 for igniting a car engine.

The central conducting stem 46 is partitioned from the elbow member 44 by an electrically insulative tube 45 having a central hole 451 longitudinally formed through the tube 45 for passing the conducting stem 46 in the central hole 451 for positioning the stem 46 in the insulative tube 45.

The grounding spring 47 has a fixed spring end 471 secured with the cylindrical socket 43, a free spring end 472 contacted with a grounding wall 62 of the plug 6 or contacted with an engine cover 7, and a grounding lead 473 which is secured to the spring 47 and may be a rod, a plate or a wire grounded to earth.

As shown in FIG. 5, several contactors 51 of the distributor cap 52 may be parallelly connected through several cables 1 to plural plugs 6 for sequentially (A, B, C, D) transmitting the high voltage current in the distributor 5 to the plugs 6 for igniting plural engine cylinders (not shown).

Figure 6:
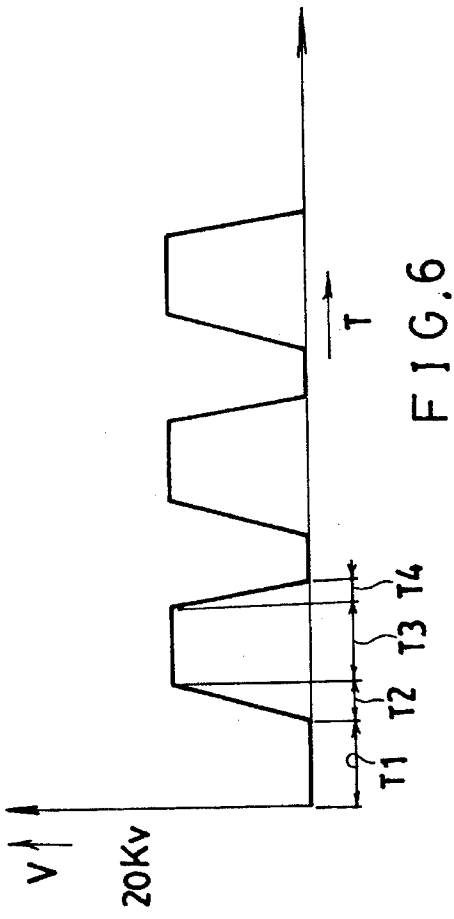
FIG. 6 is an illustration showing the waveforms of ignition current in accordance with the present invention, having an ordinate showing the voltage and an abscissa showing the time.
Figure 7:
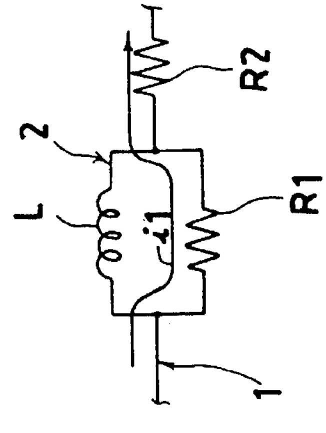
FIG. 7 shows a current flow situation of the present invention during the T2 period as shown in FIG. 6.

As shown in FIGS. 5–9, the operating principle for eliminating the interferences caused by high tension of the cable 1 and the plug 6 is explained hereinafter:

As shown in FIGS. 6 and 7, the time period T1 indicates a state before ignition having zero voltage on the ordinate of FIG. 6, while T2 indicates a charging period having a high-voltage pulse fed into the cable 1. As being obstructed by a high impedance in the inductor L, the current i1 will pass through the high-impedance resistor R1 to conduct current across the inductor L for charging the inductor L. During the charging period, the high-voltage impulse has a time delay to reach its peak value to thereby prevent any acute rising edge of the wave form to inhibit the energy of high frequency spectrum to thereby eliminate interference caused therefrom.

Figure 8:
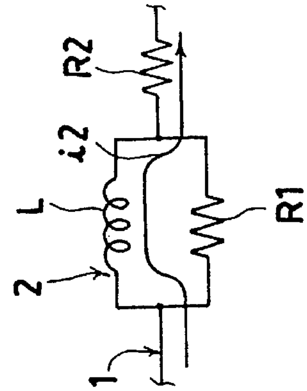
FIG. 8 shows a current flow of the present invention during the T3 period of FIG. 6.
Figure 9:
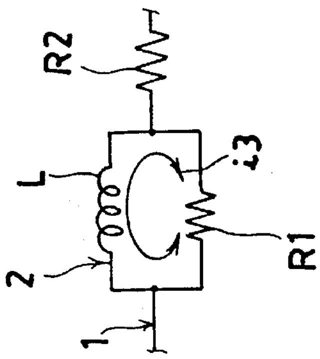
FIG. 9 shows the current flow during the T4 period of FIG. 6.

In period T3 as shown in FIGS. 6 and 8, the inductor L has been saturated and conducted to allow the current i2 to pass through the inductor L and low-impedance resistor R2 to transmit high voltage ignition current for effectively igniting or sparking the plug 6. The low-impedance resistor R2 may inhibit any instant surge waves carried in the ignition current for further preventing any interference therefrom.

When the ignition is finished to stop high voltage impulse fed in the interference eliminating means 2, the electric charge previously stored in the inductor L will oppose a current flow to discharge the current i3 (FIG. 9) in the high-impedance resistor R1 to consume the stored charge to gradually drop the wave form as shown in T4 period of FIG. 6 to make a smooth drop edge of the wave form to inhibit the energy of high frequency spectrum to prevent acute waveform and interference caused therefrom.

Therefore, the present invention may eliminate any interference of high voltage transmission of a coaxial cable connected between a car distributor and an engine plug by shielding and grounding the central conductor 11 by at least a braided layer and by inhibiting the acute waveforms to prevent interference by the circuit of the inductor L and the resistors R1, R2 to be advantageous to a cable between the distributor and the plug.

The present invention may be modified without departing from the spirit and scope of this invention.

I claim:

1. An ignition cable means comprising:

a coaxial cable (1) having a central conductor (11) connectable between a car distributor (5) and an engine plug (6), and at least a braided layer (12, 13) surrounding said central conductor (11) and grounded to the earth for shielding and grounding an interference emitted from a high voltage in the central conductor (11); and an interference eliminating means (2) inserted in between two cable sections (1a, 1b) of said coaxial cable (1), and including an inductor (1) parallelly connected with at least a resistor (R1) having impedance for limiting an ignition current in said cable, and connected in between said two cable sections (1a, 1b) for alternatively conducting a current in said resistor (R1) and said inductor (L) for making a smooth waveform of a high voltage pulse in said cable (1) for eliminating an interference caused from said cable (1).

2. An ignition cable means according to claim 1, wherein said coaxial cable (1) includes: a first cable section (1a) connected between a first adapter (3) connectable to the distributor (5) and the interference eliminating means (2), and a second cable section (1b) connected between the interference eliminating means (2) and the second adapter (4) connectable to the plug (6), each said cable section (1a, 1b) including said central conductor (11) formed in a center of said cable (1), a first braided layer (12) surrounding the central conductor (11) for shielding interference emitted from the central conductor (11), and a second braided layer (13) circumferentially disposed around the first braided layer (12) with an electrically insulative layer (121) intermediate between the first and the second braided layers (12, 13) with the second braided layer (13) grounded for grounding and eliminating interference as induced in the second braided layer (13), and an outer insulative cover (14) clad on the outer circumference of the second braided layer (13).

3. An ignition cable means according to claim 2, wherein said interference eliminating means (2) includes: an electrically insulative sleeve (21) generally cylindrical shaped and connected in between the first and the second cable sections (1*a*, 1*b*); a high-impedance resistor (R1) connected in series with a low-impedance resistor (R2) having a resistance lower than that of the high-impedance resistor (R1), in between two central conductors (11) respectively formed in the first and the second cable sections (1*a*, 1*b*); said inductor L parallelly connected with the high-impedance resistor (R1) and connected in series with the low-impedance resistor (R2); and a grounding coupler (27) made of electrically conductive cylinder and connecting two said second braided layers (13) of the first and the second cable sections (1*a*, 1*b*) of the coaxial cable (1) to be grounded for grounding and eliminating interferences existing in the cable (1).

4. An ignition cable means according to claim 3, wherein said high-impedance resistor (R1) is connected to the low-impedance resistor (R2) by a central connecting plate (22) formed in a central portion of the insulative sleeve (21); the inductor (L) retained between the central connecting plate (22) and a first connector (24) connected to the central conductor (11) of the first cable section (1a) of the coaxial cable (1); the high-impedance resistor (R1) having a first electrically conductive spring (23) retained between the high-impedance resistor (R1) and the first connector (24) to be connected to the first cable section (1*a*) of the coaxial cable (1); and the low-impedance resistor (R2) having a second electrically conductive spring (25) retained between the low-impedance resistor (R2) and a second connector (26) connected to the central conductor (11) of the second cable section (1*b*) of the coaxial cable (1).

5. An ignition cable means according to claim 3, wherein said electrically insulative sleeve (21) of the interference eliminating means (2) is coated with an electrically insulative medium (28) which is shielded by the grounding coupler (27) which is covered by an outer insulative sheath (29) intermediate between two outer insulative covers (14) of the first and the second cable sections (1*a*, 1*b*).

6. An ignition cable means according to claim 2, wherein said second adapter (4) includes: a cable connector (41) for fastening the outer insulative cover (14) of the second cable section (1*b*), a plug connector (42) secured with the cable connector (41) for coupling the plug (6) respectively for connecting the central conductor (11) of the coaxial cable (1) to a central electrode (61) of the plug (6) for igniting the plug (6), and for connecting the second braided layer (13) of the coaxial cable (1) to a grounding wall (62) of the plug (6) for grounding interference emitted from the second braided layer (13) of the coaxial cable (1).

7. An ignition cable means according to claim 5, wherein said second adapter (4) includes: the plug connector (42) made of electrically insulative material, a cylindrical socket (43) made of electrically conductive and secured in the plug connector (42), an elbow member (44) made of electrically conductive and having a first clip (441) for fastening the second braided layer (13) of the coaxial cable (1) and a second clip (442) connected to the first clip (441) for fastening a neck portion (431) formed on one end portion of the cylindrical socket (43), a grounding spring (47) retained between the cylindrical socket (43) and the grounding wall (62) of the plug (6) for grounding interference caused from the cable (1) and the plug (6), a central conducting stem (46) secured in a central portion in the plug connector (42) and connected with a terminal end portion (111) of the central conductor (11) of the coaxial cable (1) and having an electrode cap (461) secured to the conducting stem (46) for connecting the central electrode (61) of the plug (6) for delivering a high voltage current in the central conductor (11) of the coaxial cable (1) to spark the plug (6) for igniting a car engine.

8. An ignition cable means according to claim 7, wherein said central conducting stem (46) is partitioned from the elbow member (44) by an electrically insulative tube (45) having a central hole (451) longitudinally formed through the tube (45) for passing the conducting stem (46) in the central hole (451) for positioning the stem (46) in the insulative tube (45).

9. An ignition cable means according to claim 7, wherein said grounding spring (47) has a fixed spring end (471) secured with the cylindrical socket (43), a free spring end (472) contacted with a grounding wall (62) of the plug (6) and connectable to an engine cover (7), and a grounding lead (473) secured to the spring (47) and grounded to the earth.

* * * * *